United States Patent
Park (10) Patent No.: US 11,505,235 B2
(45) Date of Patent: Nov. 22, 2022

(54) VEHICLE STEERING COLUMN

(71) Applicant: MANDO CORPORATION, Pyeongtaek-si (KR)

(72) Inventor: Sung Hun Park, Anyang-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/278,592

(22) PCT Filed: Sep. 20, 2019

(86) PCT No.: PCT/KR2019/012261
§ 371 (c)(1),
(2) Date: Mar. 22, 2021

(87) PCT Pub. No.: WO2020/060303
PCT Pub. Date: Mar. 26, 2020

(65) Prior Publication Data
US 2021/0347405 A1    Nov. 11, 2021

(30) Foreign Application Priority Data
Sep. 21, 2018  (KR) .......... 10-2018-0114023

(51) Int. Cl.
*B62D 1/185*   (2006.01)
*B62D 1/181*   (2006.01)

(52) U.S. Cl.
CPC ............ *B62D 1/185* (2013.01); *B62D 1/181* (2013.01)

(58) Field of Classification Search
CPC ................................ B62D 1/185; B62D 1/181
See application file for complete search history.

(56) References Cited

U.S. PATENT DOCUMENTS 4,901,593 A * 2/1990 Ishikawa ............... B62D 1/181
                                                280/775
5,178,411 A * 1/1993 Fevre ..................... B62D 1/181
                                                280/775

(Continued)

FOREIGN PATENT DOCUMENTS

JP     2014-231288 A    12/2014
JP     2018-47809 A      3/2018

(Continued)

OTHER PUBLICATIONS

International Search Report dated Jan. 9, 2020 for corresponding International Patent Application No. PCT/KR2019/012261.

(Continued)

*Primary Examiner* — Drew J Brown
(74) *Attorney, Agent, or Firm* — Hauptman Ham, LLP (57) ABSTRACT

A steering column for vehicle is disclosed. The steering column for vehicle according to an embodiment of the present disclosure include a steering shaft; an inner tube into which the steering shaft is inserted and coupled and which forwardly or backwardly moves the steering shaft when moving in the longitudinal direction; an outer tube moving together with the inner tube when moving in the longitudinal direction, and coupled to the outside of the inner tube to allow the inner tube to independently move in the longitudinal direction; an outer tube drive for moving the outer tube in the longitudinal direction; and an inner tube drive for moving the inner tube in the longitudinal direction.

9 Claims, 5 Drawing Sheets

(56) References Cited

U.S. PATENT DOCUMENTS

| | | | |
|---|---|---|---|
| 10,189,496 B2 * | 1/2019 | King | B62D 1/184 |
| 11,198,464 B2 * | 12/2021 | Watanabe | B62D 1/183 |
| 2015/0375768 A1 | 12/2015 | Fevre et al. | |
| 2017/0029009 A1 | 2/2017 | Rouleau | |
| 2021/0229733 A1 * | 7/2021 | Kurokawa | F16B 7/14 |
| 2021/0323598 A1 * | 10/2021 | Watanabe | B62D 1/181 |

FOREIGN PATENT DOCUMENTS

| | | |
|---|---|---|
| KR | 10-2020-0034340 A | 3/2020 |
| WO | 2017/097662 A1 | 6/2017 |
| WO | 2018/073305 A1 | 4/2018 |
| WO | WO-2021049803 A1 * | 3/2021 |

OTHER PUBLICATIONS

German Office Action dated Jun. 2, 2021 for corresponding German Patent Application No. 11 2019 004 741.8.

* cited by examiner

VEHICLE STEERING COLUMN

CROSS-REFERENCE TO RELATED APPLICATION

The present application is a national stage filing under 35 U.S.C § 371 of PCT application number PCT/KR2019/012261 filed on Sep. 20, 2019 which is based upon and claims the benefit of priorities to Korean Patent Application No. 10-2018-0114023, filed on Sep. 21, 2018 in the Korean Intellectual Property Office, which are incorporated herein in their entireties by reference.

TECHNICAL FIELD

The present disclosure relates to a steering column for vehicle, and more particularly, to a steering column for vehicle that increases the speed and range of a telescopic operation of the steering column.

BACKGROUND

The steering column for vehicle may include telescopic and tilting functions for the convenience of a driver. The driver can adjust the position of the steering wheel to suit his/her height or body shape by adjusting the protrusion degree and angle of the steering column through the telescopic and tilting functions. In recent years, it is common to combine an actuator for telescopic and tilting operation on a vehicle steering column so that the telescopic and tilting operation of the steering column can be performed electrically.

In such an electric steering column for vehicle, the telescopic operation has a longer operating time compared to the tilting operation. This is because the telescopic operating range is larger than that of the tilt, but it does not have a proportionally large operation speed. To solve this problem, it is necessary to increase the telescopic operating speed.

Meanwhile, the operating stroke or the operating range of the telescope is usually at the level of 50 mm, but as vehicles begin to adopt autonomous driving functions, the expansion of the telescopic operation range is required to the level of 200-300 mm.

However, currently, one tube for performing a telescopic operation and one actuator for moving the tube are placed in the electric steering column for vehicle, and due to the problem of the limitation of the length of the actuator screw and the decrease in the rigidity of the column, etc., it is recognized as a difficult task to increase the operating speed of the telescope and expand the operating range.

The above information disclosed in this Background section is only for enhancement of understanding of the background of the invention and it may therefore contain information that does not form the prior art that is already known to a person of ordinary skill in the art.

SUMMARY

The present disclosure is to solve the problems of the related art described above.

The present disclosure is directed to providing a steering column for vehicle that enables to increase the operating speed of the telescope and expand the operating range through a dual structure of an inner tube and an outer tube and their separate drive.

The object of the present disclosure is not limited thereto, and other objects not mentioned will be clearly understood by those of ordinary skill in the art from the following description.

One aspect of the present disclosure is directed to providing a steering column for vehicle according to an embodiment of the present disclosure include a steering shaft; an inner tube into which the steering shaft is inserted and coupled and which forwardly or backwardly moves the steering shaft when moving in the longitudinal direction; an outer tube moving together with the inner tube when moving in the longitudinal direction, and coupled to the outside of the inner tube to allow the inner tube to independently move in the longitudinal direction; an outer tube drive for moving the outer tube in the longitudinal direction; and an inner tube drive for moving the inner tube in the longitudinal direction.

In this case, the steering column for vehicle may include a housing coupled surrounding at least a portion of the outer tube, wherein the outer tube drive may be installed on the housing and the inner tube drive may be installed on the outer tube.

In addition, in this case, the outer tube drive may include a first actuator which is installed on the housing and a first moving member which is operated by the first actuator and moves the outer tube in the longitudinal direction.

In addition, in this case, the housing may include a first through hole formed along the longitudinal direction and the first moving member may be coupled to the outer tube through the first through hole.

Meanwhile, the inner tube drive may include a second actuator which is installed on the outer tube and a second moving member which is operated by the second actuator and moves the inner tube in the longitudinal direction.

In this case, the housing may include a second through hole formed along the longitudinal direction, the outer tube may include a third through hole formed in the longitudinal direction in a portion corresponding to the second through hole, the second actuator may be installed on the outer tube through the second through hole, and the second moving member may be coupled to the inner tube through the second through hole and the third through hole.

According to an embodiment of the present disclosure, the telescopic operating range of the steering column for vehicle may be expanded through the dual structure of the inner tube and the outer tube.

In addition, according to an embodiment of the present disclosure, the inner tube can independently move in the longitudinal direction separately from the movement of the outer tube, thereby improving the telescopic operating speed of the steering column for vehicle.

Advantageous effects of the present disclosure are not limited to the above-described effects, and should be understood to include all effects that can be inferred from the configuration of the disclosure described in the detailed description or claims of the present disclosure.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity. Throughout the specification, like reference numerals denote like elements.

It is understood that the terms "comprise" or "have" when used in this specification, are intended to specify the presence of stated features, integers, steps, operations, members, components and/or a combination thereof but not preclude the possibility of the presence or addition of one or more other features, integers, steps, operations, members, components, or a combination thereof.

Figure 1:
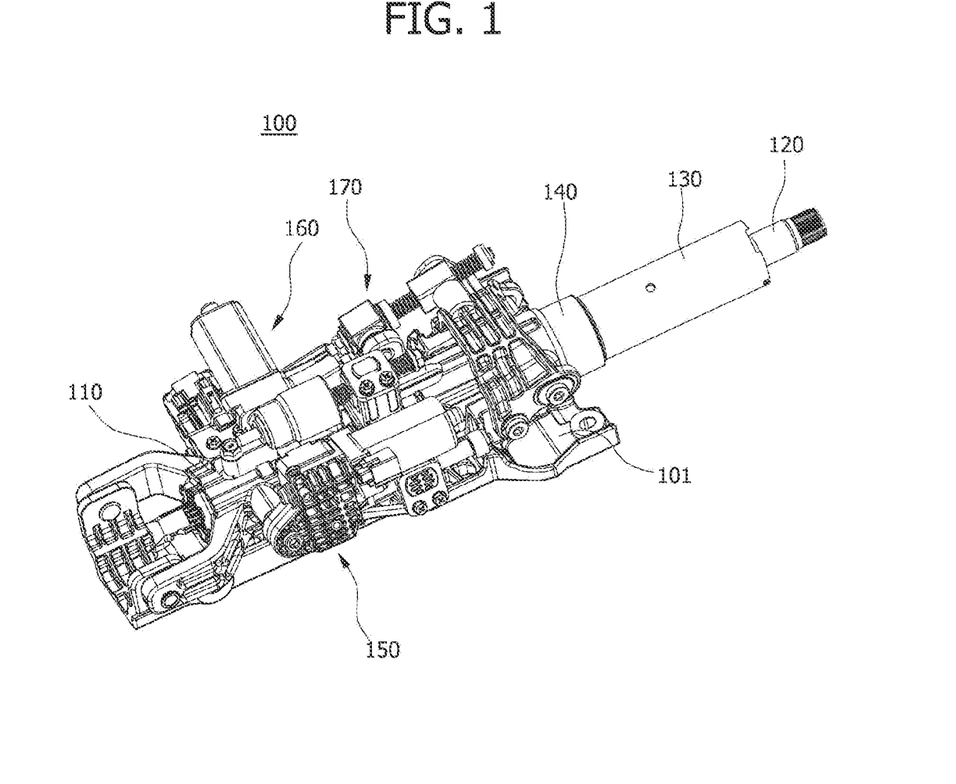
FIG. 1 is a perspective view of a steering column for vehicle according to an exemplary embodiment of the present disclosure.
Figure 2:
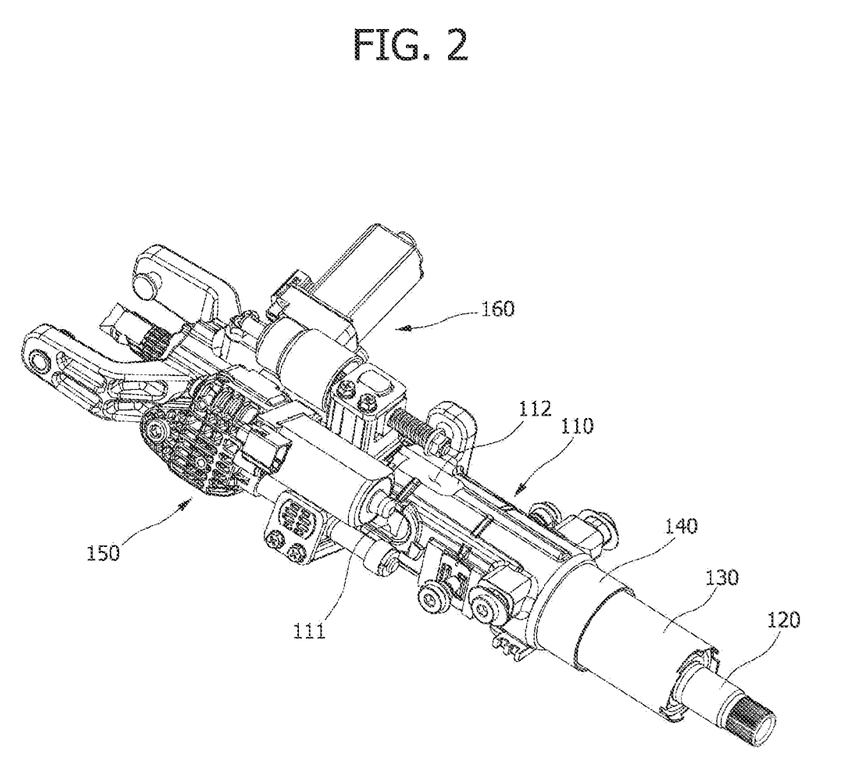
FIG. 2 is a perspective view showing a main configuration of a steering column for vehicle according to an exemplary embodiment of the present disclosure.
Figure 3:
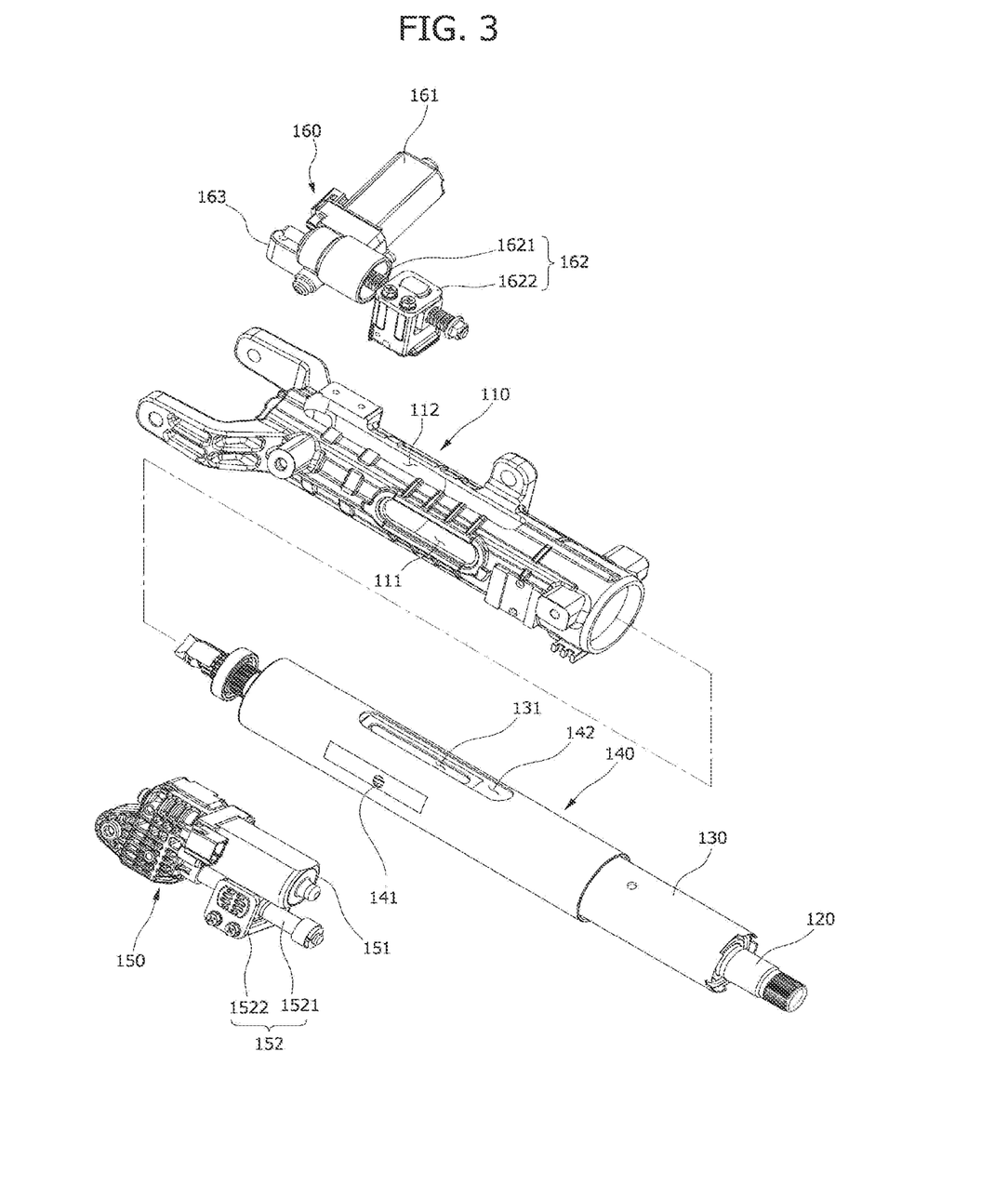
FIG. 3 is an exploded perspective view of a steering column for vehicle according to an exemplary embodiment of the present disclosure.

FIG. 1 shows a perspective view of a steering column for vehicle according to an exemplary embodiment of the present disclosure, FIG. 2 shows a perspective view showing a main configuration of a steering column for vehicle according to an exemplary embodiment of the present disclosure, and FIG. 3 shows an exploded perspective view of a main configuration of a steering column for vehicle according to an exemplary embodiment of the present disclosure.

Referring to FIGS. 1 to 3, a steering column for vehicle 100 according to an embodiment of the present disclosure includes a housing 110, a steering shaft 120, an inner tube 130, an outer tube 140, an outer tube drive 150 and an inner tube drive 160.

The housing 110 has a hollow shape, and inside the housing 110 are inserted the steering shaft 120, the inner tube 130, and the outer tube 140. The housing 110 is coupled surrounding at least a portion of the outer tube 140. The housing 110 may be coupled to the vehicle body through a mounting bracket 101 or the like. In addition, the housing 110 may have a collision energy absorbing structure to absorb collision energy while performing a collapse motion with the outer tube 140.

The housing 110 includes a first through hole 111 formed along the longitudinal direction and a second through hole 112 formed along the longitudinal direction. The first through hole 111 and the second through hole 112 may be formed in a slot shape along the longitudinal direction of the housing 110. As will be described later, a first moving member 152 of the outer tube drive 150 may be coupled through the first through hole 111, and a second actuator 161 of the inner tube drive 160 may be installed on the outer tube 140 through the second through hole 112.

In an embodiment of the present disclosure, the first through hole 111 is formed on one side of the housing 110, and the second through hole 112 is formed on the upper portion of the housing 110. In addition, the first through hole 111 and the second through hole 112 are formed in parallel. The lengths of the first through hole 111 and the second through hole 112 may be determined in consideration of the range of motion of the inner tube 130 and the outer tube 140, respectively. In an embodiment of the present disclosure, the length of the second through hole 112 may be formed to be longer than the length of the first through hole 111.

The steering shaft 120 is a part that transmits a manipulation force when a driver manipulates a steering wheel (not shown). The steering shaft 120 may be coupled to the housing 110 through the inner tube 130 and the outer tube 140. The steering shaft 120 is coupled to the inner tube 130 and moves forward or backward according to the movement of the inner tube 130 in the longitudinal direction. Accordingly, the steering shaft 120 is extended or shortened to the driver. That is, the telescopic operation of the steering column for vehicle 100 is performed.

The steering shaft 120 may include an upper shaft and a lower shaft, and any one of the upper shaft and the lower shaft may be inserted into the other one and formed in a slidable shape along the mutual axial direction, thereby additionally forming a structure capable of expansion and contraction.

The inner tube 130 is a portion in which the steering shaft 120 is inserted and coupled, and when the inner tube 130 moves in the longitudinal direction, the steering shaft 120 moves forward or backward. The inner tube 130 moves together with the outer tube 140 according to the longitudinal movement of the outer tube 140, but is coupled to the outer tube 140 in a form that can independently move in the longitudinal direction separately from the outer tube 140.

The inner tube 130 has a first coupling portion 131 for coupling with the second moving member 162 of the inner tube drive 160. The first coupling portion 131 may be formed of a slot formed along the longitudinal direction of the inner tube 130.

The outer tube 140 is coupled to the outside of the inner tube 130. More specifically, the outer tube 140 moves the inner tube 130 together when moving in the longitudinal direction, but has a shape allowing the inner tube 130 to independently move in the longitudinal direction and is coupled to the outside of the inner tube 130.

The outer tube 140 has a second coupling portion 141 for coupling with the first moving member 152 of the outer tube drive 150. The second coupling portion 141 is formed in a position corresponding to the first through hole 111 of the housing 110. The second coupling portion 141 may be formed of a screw hole that is screwed with the first moving member 152.

In addition, the outer tube 140 includes a third through hole 142 formed in the longitudinal direction in a portion corresponding to the second through hole 112 of the housing 110. The second moving member 162 of the inner tube drive 160 may be coupled to the inner tube 130 through the third through hole 142. In addition, the second moving member 162 of the inner tube drive 160 may move through the third through hole 142.

The outer tube drive 150 moves the outer tube 140 in the longitudinal direction. The outer tube drive 150 is installed on the housing 110. The outer tube drive 150 includes a first actuator 151 and the first moving member 152.

The first actuator 151 generates a driving force for moving the outer tube 140 in the longitudinal direction. In an embodiment of the present disclosure, the first actuator 151 is made of a motor. In addition, the first actuator 151 is installed on the housing 110.

The first moving member 152 is operated by the first actuator 151 and moves the outer tube 140 in the longitudinal direction. The first moving member 152 may include a rod 1521 that linearly moves by receiving a rotational driving force from the first actuator 151, and a moving body 1522 coupled to the rod 1521 to connect the rod 1521 and the outer tube 140. As described above, the first moving member 1521 may be coupled to the outer tube 140 through the first through hole 111, wherein specifically the moving body 1522 coupled to the rod 1521 is coupled to the second coupling portion 141 of the outer tube 140 through the first through hole 111.

The inner tube drive 160 moves the inner tube 130 in the longitudinal direction. The inner tube drive 160 is installed on the outer tube 140. The inner tube drive 160 includes a second actuator 161 and the second moving member 162.

The second actuator 161 generates a driving force for moving the inner tube 130 in the longitudinal direction. In an embodiment of the present disclosure, the second actuator 161 is made of a motor. In addition, the second actuator 161 is installed on the outer tube 140. Specifically, the second actuator 161 may be coupled to the outer tube 140 through an installation member 163 coupled to the outer circumference surface of the outer tube 140, wherein the installation member 163 may be coupled to the outer tube 140 through the second through hole 112 of the housing 110.

The second moving member 162 is operated by the second actuator 161 and moves the inner tube 130 in the longitudinal direction. The second moving member 162 may be made of a ball screw and include a screw 1621 that rotates by receiving a rotational driving force from the second actuator 161 and a nut moving body 1622 that linearly moves according to the rotation of the screw 1621. The nut moving body 1622 may be coupled to the inner tube 130 through the second through hole 112 of the housing 110 and the third through hole 142 of the outer tube 140.

In an embodiment of the present disclosure, the coupling of the nut moving body 1622 and the inner tube 130 does not mean only coupling through fitting and tightening, but, may mean a connection in a form in which the inner tube 130 is moved according to the movement of the nut moving body 1622 by hooking a protrusion portion of the nut moving body 1622 to one end of the first coupling portion 131 formed in a long hole shape along the longitudinal direction of the inner tube 130.

Figure 4:
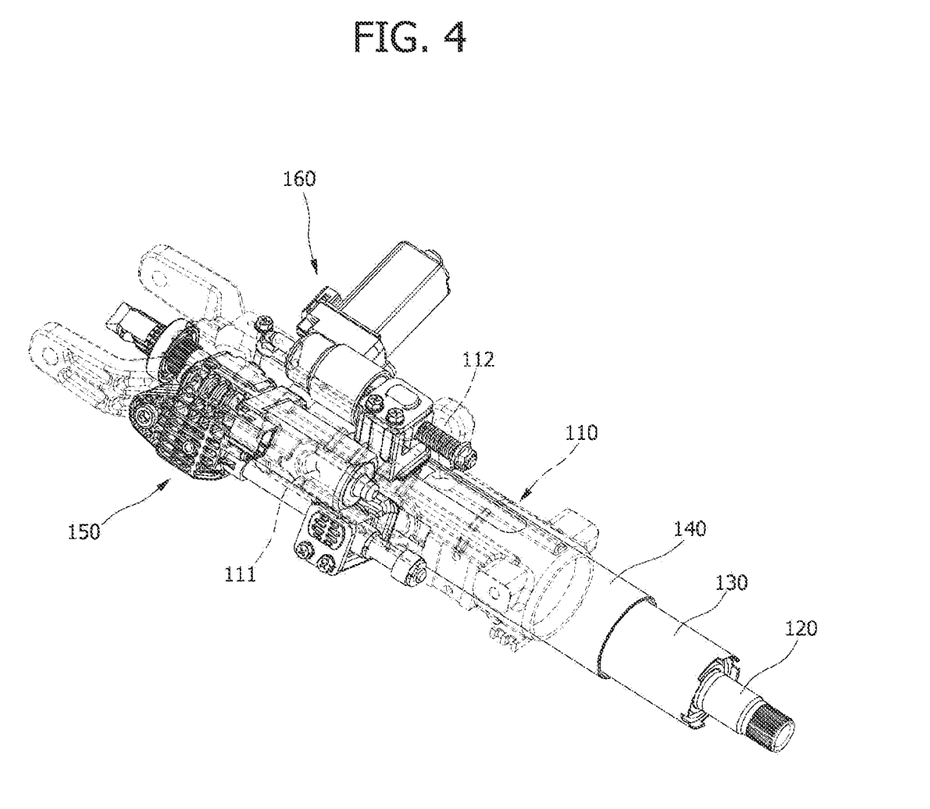
FIG. 4 is a view showing movement of an outer tube during telescopic operation of a steering column for vehicle according to an exemplary embodiment of the present disclosure.
Figure 5:
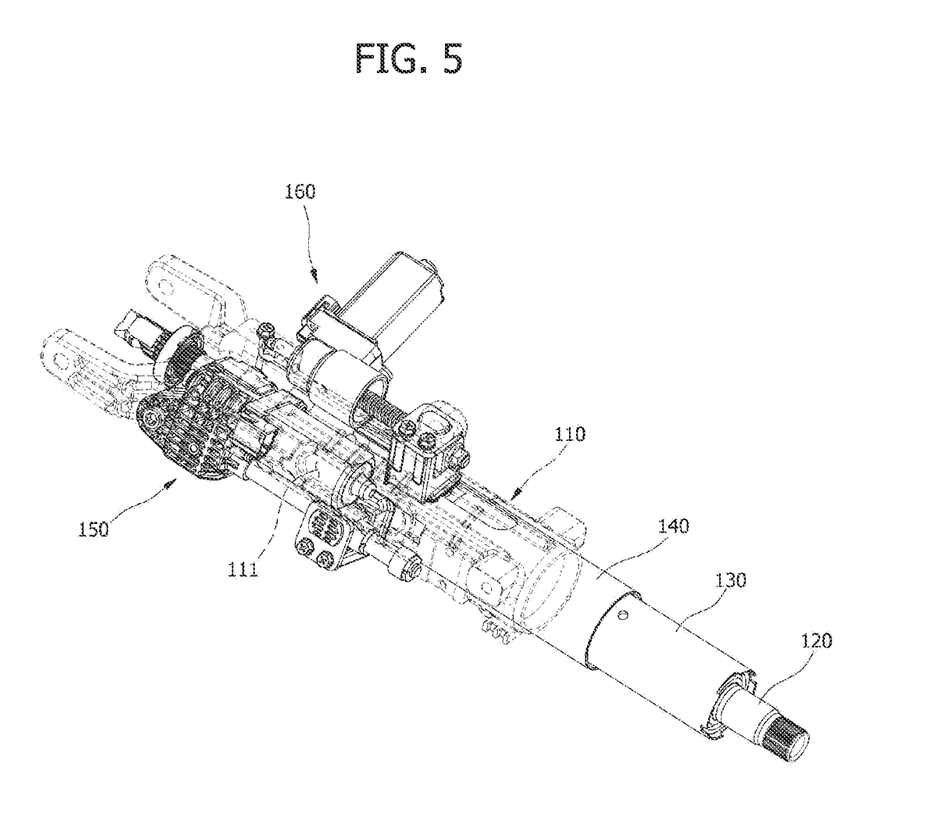
FIG. 5 is a view showing movement of an inner tube during telescopic operation of a steering column for vehicle according to an exemplary embodiment of the present disclosure.

FIG. 4 shows a view showing movement of an outer tube during telescopic operation of a steering column for vehicle according to an exemplary embodiment of the present disclosure and FIG. 5 shows a view showing movement of an inner tube during telescopic operation of a steering column for vehicle according to an exemplary embodiment of the present disclosure. In order to clearly indicate the movement of the inner tube 130 and the outer tube 140, the housing 110 is indicated by a dotted line in FIGS. 4 and 5.

The telescopic operation of the steering column for vehicle 100 will be described with reference to FIGS. 4 and 5.

First, as shown in FIG. 4, the outer tube 140 may be moved forward by the outer tube drive 150. In this case, the inner tube 130 coupled to the outer tube 140 is moved forward together, and accordingly, the steering shaft 120 is elongated. Meanwhile, the first through hole 111 of the housing 110 limits the moving range of the first moving member 152 of the outer tube drive 150.

Next, as shown in FIG. 5, the inner tube 130 may be moved forward by the inner tube drive 160. The movement of the inner tube 130 by the inner tube drive 160 may be performed simultaneously or sequentially with the movement of the outer tube 140. The steering shaft 120 coupled to the inner tube 140 is elongated according to the movement of the inner tube 140. Meanwhile, the second through hole 111[AD1] of the housing 110 and the third through hole 142 of the outer tube 140 limit the moving range of the second moving member 162 of the inner tube drive 160.

As described above, according to an embodiment of the present disclosure, the steering column for vehicle 100 may include the inner tube 130 and the outer tube 140, and the inner tube 130 may move in the longitudinal direction independently of the outer tube 140. Accordingly, it is possible to expand the telescopic operating range of the steering column for vehicle 100.

In addition, during the longitudinal movement of the outer tube 140, the inner tube 130 can also independently move in the longitudinal direction by the inner tube drive 160, thereby improving the telescopic operating speed.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

What is claimed is:

1. A steering column for vehicle, comprising:
   a steering shaft;
   an inner tube into which the steering shaft is inserted and coupled and which forwardly or backwardly moves the steering shaft when moving in a longitudinal direction;
   an outer tube moving together with the inner tube when moving in the longitudinal direction, and coupled to an outside of the inner tube to allow the inner tube to independently move in the longitudinal direction;
   an outer tube drive for moving the outer tube in the longitudinal direction;
   an inner tube drive for moving the inner tube in the longitudinal direction; and
   a housing,
   wherein
   the housing includes a through hole formed along the longitudinal direction,
   the inner tube drive includes an actuator configured to drive the inner tube to move in the longitudinal direction, and
   the actuator of the inner tube drive is directly mounted to the outer tube through the through hole of the housing.

2. The steering column for vehicle of claim 1, wherein the housing is coupled to and surrounding at least a portion of the outer tube, the outer tube drive is installed on the housing and the inner tube drive is installed on the outer tube.

3. The steering column for vehicle of claim 2, wherein the outer tube drive comprises
   an actuator which is installed on the housing and
   a moving member which is configured to be operated by the actuator of the outer tube drive and to move the outer tube in the longitudinal direction.

4. The steering column for vehicle of claim 3, wherein
   the housing comprises a further through hole formed along the longitudinal direction and the moving member of the outer tube drive is coupled to the outer tube through the further through hole of the housing.

5. The steering column for vehicle of claim 2, wherein the inner tube drive further comprises
a moving member which is configured to be operated by the actuator of the inner tube drive and to move the inner tube in the longitudinal direction.

6. The steering column for vehicle of claim 5, wherein
the outer tube comprises a through hole formed in the longitudinal direction in a portion corresponding to the through hole of the housing, and
the moving member of the inner tube drive is coupled to the inner tube through the through hole of the housing and the third through hole of the outer tube.

7. A steering column for vehicle, comprising:
a steering shaft;
an inner tube into which the steering shaft is inserted and coupled and which forwardly or backwardly moves the steering shaft when moving in a longitudinal direction;
an outer tube moving together with the inner tube when moving in the longitudinal direction, and coupled to an outside of the inner tube to allow the inner tube to independently move in the longitudinal direction;
an outer tube drive for moving the outer tube in the longitudinal direction;
an inner tube drive for moving the inner tube in the longitudinal direction; and
a housing coupled to and surrounding at least a portion of the outer tube,
wherein
the outer tube drive is installed on the housing_and the inner tube drive is installed on the outer tube,
the inner tube drive comprises
an actuator which is installed on the outer tube and
a moving member which is operated by the actuator and moves the inner tube in the longitudinal direction,
the housing comprises a through hole formed along the longitudinal direction,
the outer tube comprises a through hole formed in the longitudinal direction in a portion corresponding to the through hole of the housing,
the actuator of the inner tube drive is installed on the outer tube through the through hole of the housing, and
the moving member of the inner tube drive is coupled to the inner tube through the through hole of the housing and the through hole of the outer tube.

8. The steering column for vehicle of claim 7, wherein the outer tube drive comprises
an actuator which is installed on the housing and
a moving member which is configured to be operated by the actuator of the outer tube drive and to move the outer tube in the longitudinal direction.

9. The steering column for vehicle of claim 8, wherein
the housing comprises a further through hole formed along the longitudinal direction, and
the moving member of the outer tube drive is coupled to the outer tube through the further through hole of the housing.

* * * * *